(12) United States Patent
Cain et al.

(10) Patent No.: US 12,474,963 B2
(45) Date of Patent: Nov. 18, 2025

(54) SYSTEM AND METHOD FOR DYNAMICALLY MODIFYING MEDIA PROCESSING FUNCTIONS TO CONTROL OPTIMIZATION OF A MEDIA PRODUCTION

(71) Applicant: Grass Valley Canada, Montreal (CA)

(72) Inventors: James Westland Cain, Newbury (GB); Charles S. Meyer, Grass Valley, CA (US)

(73) Assignee: GRASS VALLEY CANADA, Montreal (CA)

( * ) Notice: Subject to any disclaimer, the term of this patent is extended or adjusted under 35 U.S.C. 154(b) by 458 days.

(21) Appl. No.: 18/058,470

(22) Filed: Nov. 23, 2022

(65) Prior Publication Data
US 2023/0205589 A1    Jun. 29, 2023

Related U.S. Application Data

(60) Provisional application No. 63/282,832, filed on Nov. 24, 2021.

(51) Int. Cl.
*G06F 9/46* (2006.01)
*G06F 9/50* (2006.01)
*H04N 21/854* (2011.01)

(52) U.S. Cl.
CPC ......... *G06F 9/5033* (2013.01); *H04N 21/854* (2013.01)

(58) Field of Classification Search
CPC .............................. G06F 9/5033; H04N 21/854
See application file for complete search history.

(56) References Cited

U.S. PATENT DOCUMENTS

2018/0293102 A1   10/2018   Ray et al.
2019/0108106 A1   4/2019    Aggarwal et al.
2021/0182123 A1   6/2021    Pearce

OTHER PUBLICATIONS

International Search Report and Written Opinion in PCT/US2022/050930, mailed May 8, 2023, 6 pages.

*Primary Examiner* — Gregory A Kessler
(74) *Attorney, Agent, or Firm* — ARENTFOX SCHIFF LLP

(57) ABSTRACT

A system is provided for dynamically modifying media processing functions to control optimization of a media production. The system includes a media processing function library that stores media processing functions that each include a subgraph embedded therein that has pre-calculated parameters and undefined variable parameters. Media processing engines execute the plurality of media processing functions to create the media production. Moreover, the system includes a media function management controller that places the media processing functions in a job queue to be executed by one or more of the media processing engines. A resource manager receives a media production instruction from a client device to partially deploy the media processing functions in the job queue. During execution, the media processing engine can receive an input deliverable that constrains the undefined variable parameters, such that the partially deployed media processing functions is dynamically modified during runtime to create the media production.

18 Claims, 5 Drawing Sheets

SYSTEM AND METHOD FOR DYNAMICALLY MODIFYING MEDIA PROCESSING FUNCTIONS TO CONTROL OPTIMIZATION OF A MEDIA PRODUCTION

CROSS REFERENCE TO RELATED APPLICATIONS

This application claims priority to U.S. Patent Provisional No. 63/282,832, filed Nov. 24, 2021, the entire contents of which are hereby incorporated by reference.

TECHNICAL FIELD

The system and method disclosed herein is related to media production, and, more particularly, to a system and method for dynamically modifying media processing functions to control optimization of a media production.

BACKGROUND

Media productions typically involve capturing media content from one or a plurality of live scenes (e.g., a sports venue, news broadcast, video game platforms, and the like), transmitting the captured content to a remote production facility where the video and audio signals are managed by production switchers, graphics effects are added, and the like, and then the processed signals are encoded for transport to a distribution network, such as a television broadcasting network, through one or a plurality of signals. More recently, broadcasting and media production has evolved from analog to digital domain and across various protocols (e.g., MPEG-2, Internet Protocol (IP), IPTV, Ethernet). In IP technology, there are myriad tools, software code bases, and the like, that present an infinite set of combinations, or development efforts, which lead to a final "product" (e.g., a media production) through execution of media production workflows that incorporate these tools.

Moreover, with the continuous growth, development and accessibility of cloud computing platforms and networks, such as Amazon Web Service® ("AWS"), many of the processing components involved in a conventional media production environment to generate the final product are being moved to "the cloud" and/or being distributed broadly across a number of geographical locations. In the cloud, infrastructure as code (IAC) and configuration as code (CAC) provide for a very dynamic infrastructure that is effectively a software defined processing capability that enables software execution of each desired task at hand for the media production workflow. With these tools at hand, cloud computing platforms, such as AWS, have even more recently begun to offer event-driven compute services that enable a requesting client to run code for virtually any type of application or backend service to perform these types of tasks, but without provisioning or managing servers to do so. For example, AWS's "Lambda" is a computing service that runs code in response to events and automatically manages the computing resources required by that code.

While these cloud-based computing services can present an interface to abstract the available resources (e.g., storage, CPU, GPU, FPGA, bandwidth) available to a user for performing such tasks, each instance for performing a task is typically a container that is discarded after all tasks running on the instance complete. Thus, a package containing required tasks must be created and uploaded to instruct the computing service provider (e.g., AWS) to run the container(s) when an event is triggered. As a result, each such execution is run in a new environment so access to the execution context of previous and subsequent runs is not possible. Accordingly, as parameters of a given workflow change during execution of a task, these existing cloud-based computing services cannot dynamically change the use of the computing resources to optimize execution of the given task or workflow. That is, each deployment for a task is based on available assets at that time, which could lead to a varying degree of performance, even if the availability of computing resources changes or improves during such deployment.

Accordingly, a system and method is need to identify and optimize resources of the computing environments to efficiently and economically execute processing functions within task-based operations and specifically media production workflows.

SUMMARY OF THE INVENTION

Accordingly, a system and method are provided for dynamically modifying media processing functions to control optimization of a media production. In an exemplary aspect, the system and method described herein are configured to provide a user interface that illustrates workflows (e.g., media production workflows) as an optimizable "factory". In this context, the capabilities with attendant capacities for deployment of particular resources for a workflow will be represented as "lambdas". Based on a deployment target's lambda, the system and method are configured to dynamically modify constraint parameters that are set in anticipation of the target. Thus, the target lambda can be considered as a guide to placement for resource requirements, which is then dynamically modified to anticipate and optimize what resource may be accessible for executing the desired workflow.

In one exemplary aspect, the system and method provide for respective APIs that are configured for each deployed lambda. These APIs can be configured to recognize what is general about the specific resource's lambda, and then expand these constraints based on a priori knowledge of the lambda's providers resources. Accordingly, the system and method can be configured to synthesize a workflow (e.g., for a media content production), with knowledge of the potential target resources for executing tasks within the workflow, and then optimal solutions for the workflow can be deployed to include the known and necessary constraints and then, in runtime, dynamically modified to include the updated resource constraints. Effectively, the system and method provide for an optimal deployment of tasks for executing the workflow because the APIs work to anticipate a better solution that uses the same set of attributes (i.e., capabilities) disclosed by the external (e.g., cloud-based) resource's lambda.

Moreover, in another exemplary aspect, the disclosed system and method does not need to have complete knowledge of the final lambda for a particular resource. Instead, the disclosed system and method can optimize to a best solution for a media production based on knowledge of typical capabilities available in the cloud. Then, prior to deployment at a given target, an second pass optimization (e.g., compile) can be run. Thus, as resources (e.g., cloud vendor) offerings change, the lambda API installed at the cloud can change and become a unique identity constraint processor, (e.g., a linker). The system and method can then, as necessary, modify its lambda, or pre-evaluate a deployment using this new information, to achieve optimal deployment (i.e., place and route) within the cloud infrastructure for performing the specific tasks with the media production workflow. As a result, the API and a media processing function manager are configured to work together to communicate over the top of the cloud provider lambda to establish a deeper meaning for simple resource attributes, including, CPU, GPU, memory, storage, bandwidth and the like.

According to an exemplary embodiment, a system is provided for dynamically modifying media processing functions to control optimization of a media production. In this aspect, the system comprises a media processing function library configured to store a plurality of media processing functions, with the plurality of media processing functions each including a subgraph embedded therein that has at least one pre-calculated parameter and at least one undefined variable parameter; a plurality of media processing engines that are each configured to execute at least one of the plurality of media processing functions to create the media production, with the plurality of media processing engines each including at least one of a computer processing unit (CPU), a graphics processing unit (GPU), and a field programmable gate array (FPGA); a media function management controller configured to place at least a portion of the plurality of media processing functions from the media processing function library in a job queue to be executed by at least one of the plurality of media processing engines for the media production; and a resource manager configured to receive a media production instruction from a client device to partially deploy one or more of the media processing functions in the job queue to be executed by the at least one media processing engine.

Moreover, according to the exemplary aspect, during execution of the partially deployed one or more media processing functions, the at least one media processing engine is configured to receive an input deliverable that constrains the at least one undefined variable parameter of the subgraph, such that the partially deployed one or more media processing functions is dynamically modified during runtime to create the media production.

According to a refinement of the exemplary aspect, the at least one undefined variable parameter comprises a file name and the received input deliverable comprises media content associated with a file having the file name.

According to another refinement of the exemplary aspect, the plurality of media processing engines are resources available in a cloud computing network. Moreover, in one aspect, the input deliverable comprises parameter data relating to at least one of a network type, network bandwidth, network latency, processor type, and processor location of the plurality of media processing engines in the cloud computing network.

According to another refinement of the exemplary aspect, the resource manager is further configured to receive parameter data relating to at least one of a network type, network bandwidth, network latency, processor type, and processor location of the plurality of media processing engines. Yet further, the media function management controller is further configured to apply the received parameter data as the input deliverable to constrain the at least one undefined variable parameter of the subgraph.

According to another refinement of the exemplary aspect, the portion of the plurality of media processing functions are configured to perform a render function to create an effect on media content for the media production.

According to another refinement of the exemplary aspect, the resource manager is configured to partially deploy a plurality of the media processing functions in the job queue to be executed in parallel by the plurality of media processing engines, respectively, in response to the media production instruction.

According to another refinement of the exemplary aspect, the portion of the plurality of media processing functions are partially compiled before the portion of the plurality of media processing functions are placed in the job queue and the at least one media processing engine is configured to compile the partially compiled media processing functions in runtime in response to the input deliverable that constrains the at least one undefined variable parameter of the subgraph of the partially compiled media processing functions.

Moreover, in an exemplary aspect, the portion of the plurality of media processing functions placed in the job queue are tasks of a media production workflow configured to generate the media production during runtime.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
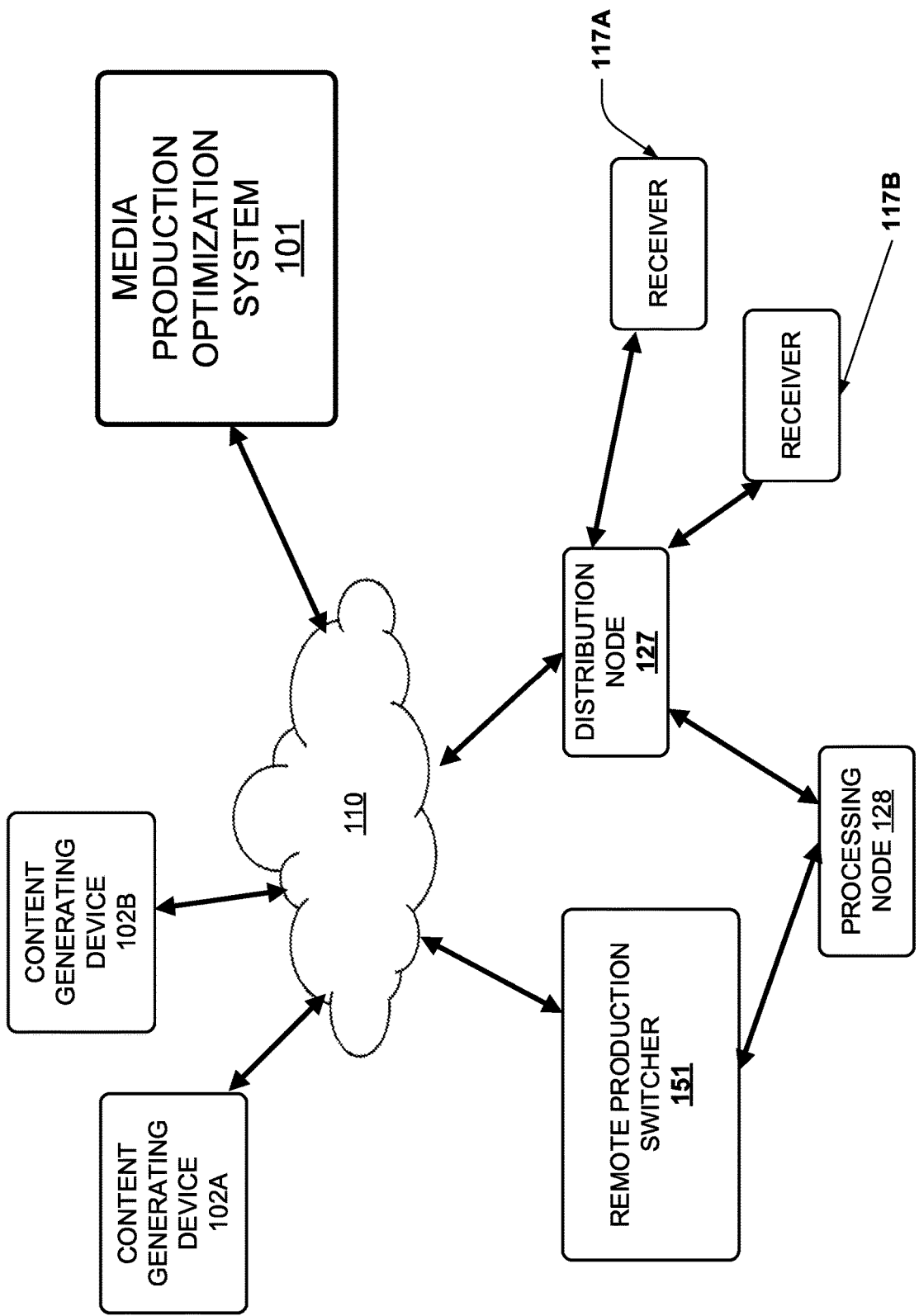
FIG. 1 illustrates a block diagram of a system for dynamically modifying media processing functions to control optimization of a media production according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the system for management of media processing functions and controlling optimization of a media productions will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

FIG. 1 illustrates a block diagram of a system for dynamically modifying media processing functions to control optimization of a media production according to an exemplary embodiment. The system 100 shown in FIG. 1 illustrates an exemplary diagram for an infrastructure for generating a media production. In one aspect, the exemplary system 100 can offer a design interface tool (e.g., a computer-aided design (CAD) software tool and user interface) that can enable a client device (e.g., client 205 in FIG. 2) to create and/or manage a workflow in a media production environment. Moreover, the media content provided for production according to system 100 is generally referred to as "essence", which denotes media that can be consumed by a user (e.g., a video clip, an audio clip, and/or ancillary data such as captions). As will be described in detail herein, the exemplary enables the dynamic modifying of media processing functions to control optimization of a media production that can implement a cloud infrastructure for performing different types of work on the media essence in the media production workflow.

As shown, the system 100 includes a media production optimization system 101, which is an infrastructure or system comprises of a software system and/or modules (e.g., implemented on one or more computer processing devices) that are configured to deploy and optimize processing functions in a cloud computing environment according to the algorithms and techniques described herein. It is also noted that while the exemplary embodiment is described in the context of media production and specifically live or real-time media production or broadcast, the disclosed system and method can be implemented to deploy processing functions as part of a workflow for any number of industries as a technique to optimize a development technology (e.g., a manufacturing factory). That is, the media production optimization system 101 can equally be implemented as a factory optimization tool in various software and hardware manufacturing and creation environments.

FIG. 1 illustrate a block diagram that is specific to a live media production environment. As described above, the media production optimization system 101 is configured to deploy functions (e.g., a processing function) as engine(s) or node(s) of a media production workflow. Thus, the media production optimization system 101 can generally be located remotely from all of the other components in the system and, in some embodiments, coupled to the components (which are part of a cloud computing environment/network) to effectively deploy and optimize the function. Thus, the components shown in system 100 are provided as an exemplary system.

An exemplary function (also referred to as tasks or media production tasks) that can implemented in a media production workflow can include multi-viewer generation, with each atomic compute function being, for example, downward image scaling to display a plurality of video feeds (e.g., input and output feeds) as inputs for the single interface of the multi-viewer. Another exemplary processing function for the workflow can include, for example, one or more codecs configured to encode and/or decode the video signals at a particular compression format for the transmission to satisfy the media request parameters. In general, such codecs are configured to perform encoding and decoding of video and audio data into data packets for transmission over IP in the media distribution network. In some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.). The one or more codecs are provided to compress the media content for transmission through the network. It is reiterated that the deployed function f(x) can be any type of processing function that is required to execute a media production workflow, for example.

As further shown, system 100 includes a plurality of content generating devices 102A and 102B, which can be configured for an A/V feed across links via the network 110. Moreover, it is noted that while only two devices are shown, the system 100 can be implemented using any number of content generating devices. The plurality of content generating devices 102A and 102B can also include, for example, remote cameras configured to capture live media content, such as the "talent" (e.g., news broadcasters, game commentators, or the like). Moreover, the content generating devices 102A and 102B can include Esports (e.g., electronic sports) real-time content, or the like. In general, it should be appreciated that while the exemplary aspect uses content generating devices 102A and 102B (which may be located at a live event, for example), a similar configuration can be used for any type of content providing device, such as a remote video server, for example, that is configured to store media content and distribute this content through the media distribution network.

As further shown, the plurality of content generating devices 102A and 102B can be coupled to a communication network 110, such as the Internet, and/or hardware conducive to internet protocol (IP). That is, system 100 can be comprised of a network of network servers and network devices configured to transmit and receive video and audio signals (e.g., media essence) of various formats. In an exemplary aspect, the communication network 110 and processing components thereof can be executed in a cloud computing environment/network. Moreover, in one aspect, essence, such as video content, that is generated (or otherwise provided) by the content generating devices 102A and 102B can be provided as an input data set for the processing functions f(x) deployed to the cloud as described herein.

In general, cloud computing environments or cloud platforms are a virtualization and central management of data center resources configured as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. As will be described in detail below, the media production optimization system 101 is configured to access metadata (e.g., "lambdas") for the plurality of cloud computing resources available for the media production workflow and deploy one or more processing functions for the media production.

In any event, as yet further shown, system 100 can include one or more remote distribution node(s) 127, one or more processing node(s) 128, and one or more remote production switcher(s) 151. As noted above, these components can be implemented as hardware components at various geographical locations or, in the alternative, as processing components as part of the cloud computing environment 101. The one or more distribution nodes 127 (e.g., electronic devices) are configured to distribute the production media content to one or more distributed nodes (e.g., remote media devices), such as receivers 117A and 117B, which can be content consuming devices (e.g., televisions, computing devices, or the like), for example. Moreover, it should be appreciated that while only two receivers 117A and 117B are shown, the network can include any number of content consuming devices configured to receive and consume (e.g., playout) the media content, with such content consuming devices even being distributed across different countries or even different continents. As a result, the system 100 can be configured as a media network for real-time production and broadcasting of video and audio content. It should also be appreciated that each of the nodes/components shown in system 100 comprise nodes of a media product workflow as would be appreciated to one skilled in the art.

In this network, distribution node(s) 127 can further be configured to distribute the media content throughout the distribution network to one or more processing node(s) 128, which may include a mix/effects engine, keyer or the like. Examples of processing node(s) 128 may include remote production switches similar to remote production switcher 151 or remote signal processors and can be included in the cloud computing environment in an exemplary aspect.

Figure 2:
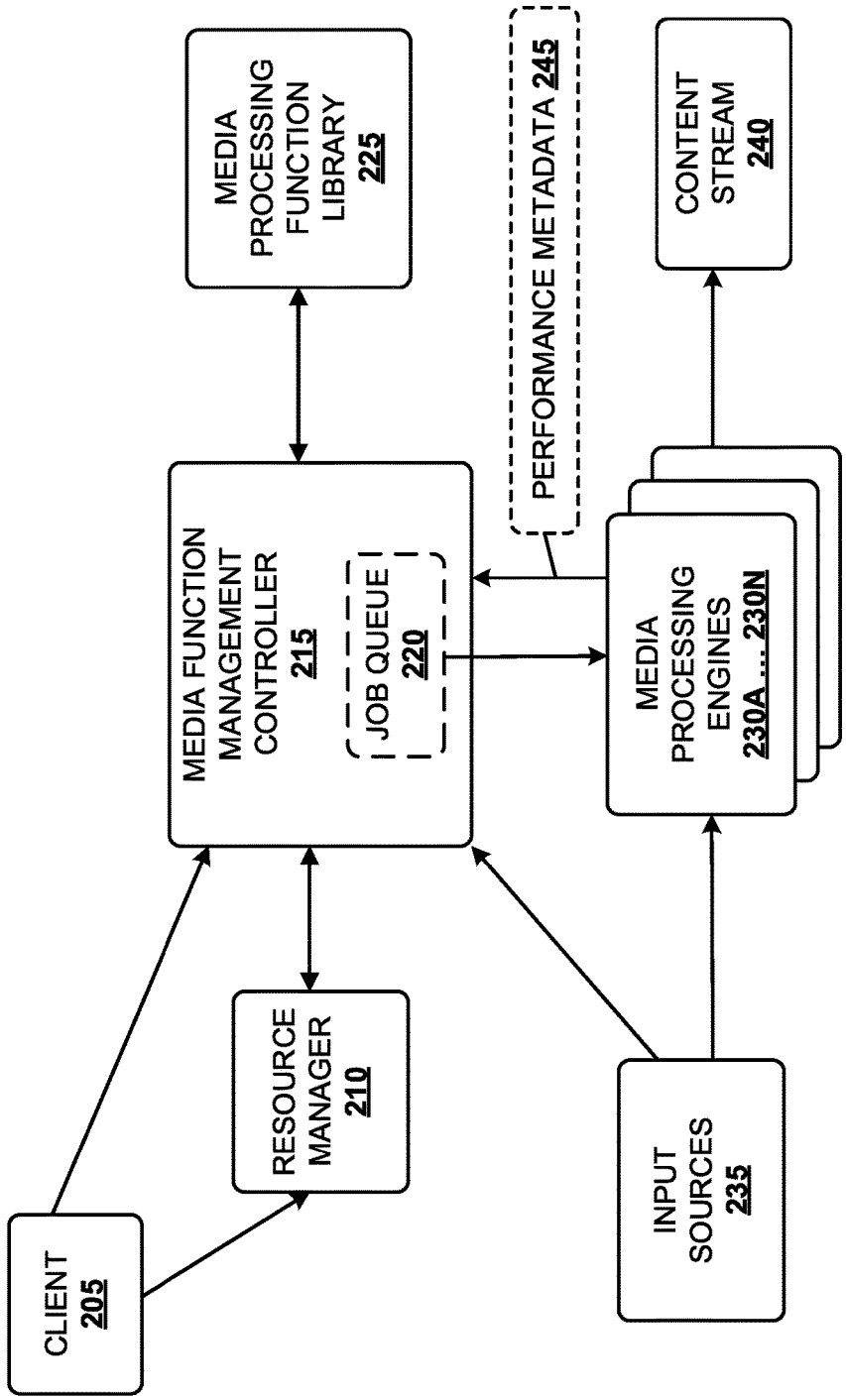
FIG. 2 illustrates another block diagram of a system for dynamically modifying media processing functions to control optimization of a media production according to an exemplary embodiment.

FIG. 2 illustrates another block diagram of a system for dynamically modifying media processing functions to control optimization of a media production according to an exemplary embodiment. In particular, it should be appreciated that FIG. 2 illustrates a more detailed block diagram of components included in the media production optimization system 101 and that also includes cloud computing network 110 of system 100. That is, the system shown in FIG. 2 illustrates a more detailed subset of the components of the media production optimization system 101 in an exemplary aspect.

As described above, the media production optimization system 101 can be implemented on one or more computers or similar computing device. In an exemplary aspect, the media production optimization system 101 can include media function management controller 215, media processing function library 225 and media processing engines 230A to 230N. In one aspect, these components are configured by a single computing system. However, in the exemplary embodiment, the media processing engines 230A to 230N can be a plurality of resources or nodes with at least a portion of them provided as cloud computing resources. Thus, as will be described below, the media function management controller 215 can be configured to deploy one or more media processing functions to be executed one or more of the media processing engines 230A to 230N during runtime and as part of a workflow of the media production. In some exemplary aspects, the media processing engines 230A to 230N can include one or more computer processing units (CPUs), a graphics processing units (GPUs), and a field programmable gate arrays (FPGAs), which can each be configured to perform the various tasks of a media production workflow.

As further shown, a client device 205 can be communicatively coupled to the media function management controller 215 to generate and/or modify a media production workflow. As described above, the client device 205 can be configured (e.g., installed thereon) with a design interface tool (e.g., a computer-aided design (CAD) software tool and user interface) that enables the client device 205 to create and/or manage a workflow for a media production environment. An example of such a media production user interface is described in U.S. patent application Ser. No. 17/324,001, filed May 18, 2021, entitled "System and Method for Generating a Factory Layout for Optimizing Media Content Production", the contents of which are hereby incorporated by reference. Using the design interface tool, a user of the client device 205 can specify a workflow for a media production that includes a plurality of tasks to be performed for generating the media production.

In addition, the media function management controller 215 can be communicatively coupled to a media processing function library 225. The media processing function library 225 stores a plurality of media processing functions, which can also be referred to as "graphs". In general, graphs (or "functions") can be defined based on primitives. For example, there may be 20 or less primitives from which all other functions can be built. Moreover, each graph can be considered as a combination of nodes and edges, where edges are sequences of frames (e.g., grains). The node, which can be considered a primitive, is the process (or function) that takes one or more input sequences of frames and produces one of more output sequences of frames applying the function. Thus, any render process can be broken down into atomic operations.

As an example, a scaler usually uses a two dimensional ("2D") decimator, which can be based on an FIR ("finite impulse response") filter, with a defined number of taps, in both directions. The FIR is then a sum of multiplied values. According to this example, the primitive can be a multiply accumulator and the function can be a decimator. Moreover, the graph or function would be a multi-viewer recruiting a number of such decimators and would provide layout, essence source, and other information for deployment of the desired function. As discussed below, parameters for the graph can be predefined or variable. In this example, variable parameters could be format, aspect ratio, frame rate and colorimetry for each essence input, as well the desired essence output. Optimization is also dynamically performed as described herein to, for example, chose these parameters based on available compute, such as bit depth, processing speed, and the like. Moreover, a "fixed" parameter in this example would be the number of taps in the FIR, although based on optimization, it could be the number of taps is changed, trading off aliasing for processing time, as an example. This example illustrates a matrix multiply primitive with its own set of parameters.

In any event, according to an exemplary aspect, the media processing functions can be partially predefined or pre-deployed tasks that are part of a media production workflow. Moreover, in one aspect, one or more of the plurality of media processing functions each including a subgraph embedded therein that has at least one pre-calculated parameter and at least one undefined variable parameter. For example, if the requested task is editing of live video content, the required bit depth, luminance, color volume, and the like, can be either a pre-calculated parameter or an undefined variable parameter that can be determined based on the defined workflow and/or on data inputs yet to be set (e.g., as part of a feedback loop for the media production).

As further shown, the media function management controller 215 can generate and/or include a job queue 220 that is configured to access one or more of the media processing functions from media processing function library 225 and load them into the job queue 220 for execution by one or more of the media processing engines 230A to 230N (which can be any available number of resources). In other words, the media function management controller 215 is configured to place at least a portion of the plurality of media processing functions from the media processing function library 225 in to the job queue 220 to be executed by at least one of the plurality of media processing engines for the media production 230A to 230N.

As further shown, the client device 205 can be coupled to a resource manager 210, although in one exemplary aspect, the resource manager 210 can be configured as a software module or application running on the client device 205. During a media production creation, the resource manager 210 is configured to receive a media production instruction from the client device 205 to partially deploy one or more of the media processing functions in the job queue 220 to be executed by the at least one media processing engine 230A to 230N. That is, using the user interface running on the client device 205, a user can create or modify a media production workflow to define tasks (e.g., resizing or generating a proxy signal or a transition effect) for the media production workflow. In turn, the resource manager 210 receives the instructions for the execution of the tasks and provides these tasks to the media function management controller 215. The media function management controller 215 then loads the media processing functions to the job queue 220. During the ongoing media production, the resource manager 210 can also instruct the media function management controller 215 to deploy the media processing functions to one or more of the media processing engine 230A to 230N for execution thereby.

As discussed above, the plurality of media processing functions each including a subgraph embedded therein that has at least one pre-calculated parameter and at least one undefined variable parameter. The pre-calculated parameters may be predefined or set parameters for executing the function (e.g., a required time to complete the task), but also undefined variable parameters. As shown, the input sources 235 can be inputted to the media processing engine 230A to 230N, which can then update media processing function with the defined parameter. Alternatively or in addition thereto, the input sources 235 can be inputted to media function management controller 215. In either case, the input data 235 can either be pushed from the original source on a periodic or continuous basis (i.e., as soon as it is updated) or pulled from the receiving component (e.g., the deployed media processing engine 230A to 230N) as would be appreciated to one skilled in the art.

After completion of the task, the content stream 240 can be output from the one or more media processing engine 230A to 230N for distribution. That is, referring back to FIG. 1, the content stream 240 can be distributed downstream from the media production optimization system 101 and to, for example, the remote production switcher 151 and/or distribution nodes 127, before ultimately being distributed to receivers 117A and/or 117B, which can be content consuming devices as discussed above. Moreover, in an alternative or additional aspect, it should be appreciated that the remote production switcher 151 and/or distribution nodes 127 (and also processing node 128) can be implemented as one or more of the media processing engine 230A to 230N.

As described above, the media processing engines 230A to 230N are resources for the workflow. Moreover, their respective capabilities for deployment can be as "lambdas", which themselves can be one or more of the input sources 235 for the execution of the media processing functions. Based on a deployment target's lambda, the media function management controller 215 can be configured to dynamically modify the constraint parameters that are set in anticipation of the target. Thus, the target lambda (e.g., a particular media processing engine 230A to 230N) can be considered as a guide to placement for resource requirements, which is then dynamically modified to anticipate and optimize what resource may be accessible for executing the task of the desired workflow.

In implementation, a plurality of application programming interfaces (APIs) are provided between the media function management controller 215 and the plurality of the media processing engines 230A to 230N. That is there are respective APIs that are configured for each deployed lambda. In an exemplary aspect, these APIs can be configured to recognize what is general about the specific resource's lambda, and then expand these constraints based on a priori knowledge of the lambda's provider's resources. Accordingly, the system and method can be configured to synthesize the workflow for the media content production, with knowledge of the potential target resources for executing tasks within the workflow. In turn, the media function management controller 215 can be configured to deploy optimal solutions for the workflow to include the known and necessary constraints and then, in runtime, dynamically modify one or more of the variable parameters (which themselves can be a sub-function) to include the updated resource constraints. Effectively, the media function management controller 215 provides for an optimal deployment of tasks for executing the workflow because the APIs work to anticipate a better solution that uses the same set of attributes (i.e., capabilities) disclosed by the external (e.g., cloud-based) resource's lambda, i.e., the available resources of media processing engine 230A to 230N.

Yet further, it should be appreciated that media processing engines 230A to 230N does not need to have complete knowledge of the final lambda for a particular resource. Instead, the disclosed system and method can optimize to a best solution for a media production based on knowledge of typical capabilities available in the cloud network. Then, prior to deployment at a given media processing engine 230A to 230N to execute a requested task, a second pass optimization (e.g., compile) can be run by media function management controller 215. Thus, as resources (e.g., cloud vendor) offerings change for each media processing engine 230A to 230N, the lambda API installed at the cloud can change and become a unique identity constraint parameter (e.g., a linker). The system and method can then, as necessary, modify its lambda, or pre-evaluate a deployment using this new information, to achieve optimal deployment (i.e., place and route) within the cloud infrastructure for performing the specific tasks with the media production workflow. As a result, each API and the media function management controller are configured to work together to communicate over the top of the cloud provider lambda to establish a deeper meaning for simple resource attributes, including, CPU, GPU, memory, storage, bandwidth and the like, of the available media processing engines 230A to 230N in the cloud computing platform.

Thus, in one exemplary aspect, performance can be measured by the deployed media processing engine of the media processing engines 230A to 230N that is designated to perform he allocated task. This information can be fed back to the media function management controller 215 in real-time or dynamically as performance metadata 245, for example. In turn, a feedback loop can be formed in which the media function management controller 215 uses this performance metadata for optimization and suggestion as to which parameters need adjusting and how much for further deployment of the task in a dynamic environment as described herein. Accordingly, in an exemplary aspect, the runtime optimization is effected as the software starts running. In particular, a first pass of the optimization is performed to compile to an abstract machine for the task deployment. A second pass optimization can be performed once the concrete machine (e.g., one of the media processing engines 230A to 230N) is identified by the media function management controller 215. A final pass optimization (which can be a resourcing pass as parameters dynamically change) is performed where measurement of the system (e.g., the nodes or engines performing the deployed task) is performed at runtime to change the global lambda. This optimization can be executed by the media function management controller 215 as part of a feedback loop receiving performance metadata 245 from the deployed engines and nodes as described above.

Figure 3:
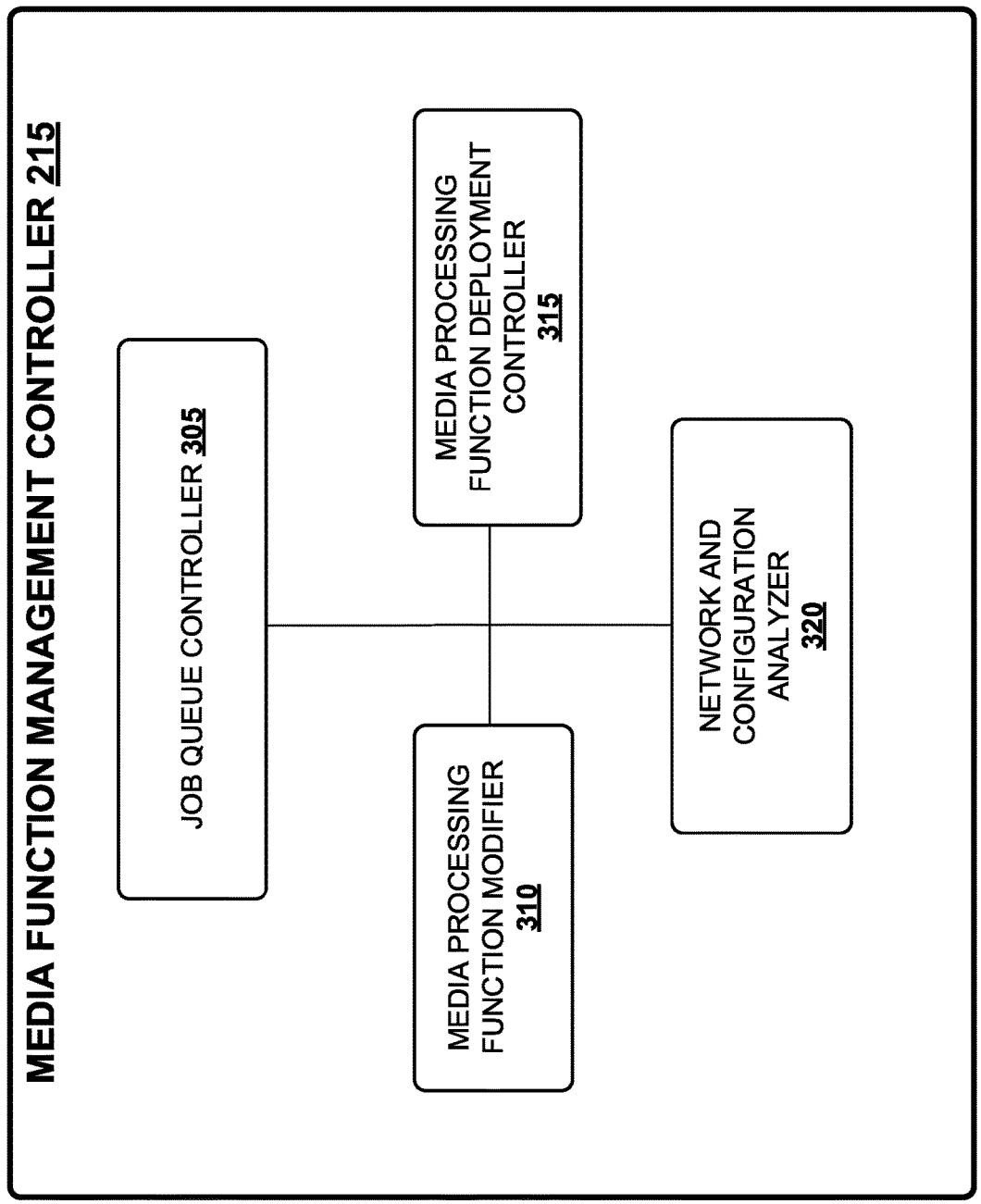
FIG. 3 illustrates a block diagram of the media function management controller in a system for dynamically modifying media processing functions to control optimization of a media production according to an exemplary embodiment.

FIG. 3 illustrates a block diagram of the media function management controller in a system for dynamically modifying media processing functions to control optimization of a media production according to an exemplary embodiment. In general, the media function management controller 215 can include a plurality of components or modules, including job queue controller 305, media processing function modifier 310, media processing function deployment controller 315 and network and configuration analyzer 320. It is noted that while each of these components/modules is shown as a component of media function management controller 215, they can also be standalone components or modules associated in alternative aspects.

In general, the term "module" as used herein can refer to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

According to the exemplary aspect, the job queue controller 305 is configured to access one or more media processing functions stored in the media processing function library 225, as described above, and load the functions into job queue 220 for subsequent deployment. For example, each media processing functions stored in the media processing function library 225 can be a separate file, executable, object or the like, that is accessed and loaded into the job queue 220.

Moreover, the media processing function deployment controller 315 can be configured to deploy the processing functions in the job queue 220 to be executed by the one or more media processing engine 230A to 230N via the respective APIs, as also described above. In one aspect, the media processing function deployment controller 315 can be is configured to query a media processing engine database (e.g., the cloud computing service provider) to determine the available resources and/or lambdas that are configurable and available to execute the desired tasks of the workflow according to defined requirements/criteria to satisfy the media production requests from the client device 205. For example, the media processing function deployment controller 315 can be configured to access one or more resource identifiers from the cloud computing network so that the media function management controller 215 can generate one or more resource allocations for deploying the media processing functions and optimally complete the desired task for satisfying user requirements. In exemplary aspects, the resource identifiers may include metadata descriptors of the type of resource, a make of the resource, capabilities of the resource, usage parameters and availabilities (including time) for the resource, network location and other linked resources. In exemplary aspects, the resource type may be physical (e.g., a computing device, mobile device, microchip, or other internet connected device, or the like), software based (e.g., a software application, a software service, a cloud computing platform, or the like), or the like.

As described above, the media processing engines 230A to 230N are resources deployed in a cloud computing platform, for example, that can be one or a plurality of processing devices configurable for executing the media processing functions in the media processing workflow. For example, the media processing engines 230A to 230N can be at least one computer processing unit (CPU), at least one graphics processing unit (GPU), and at least one field programmable gate array (FPGA). Moreover, the media processing engines 230A to 230N can be memory (e.g., cache) as needed to execute the tasks of the workflow.

Moreover, the media processing function deployment controller 315 is configured to dynamically collect and/or receive the "lambda" (including capabilities and availabilities) of the media processing engines 230A to 230N. For example, the media processing function deployment controller 315 can be configured to query a list of available resources (e.g., from the cloud computing platform) in which each resource is being linked to and shares its unique identity. In one aspect, the unique identity can be an attribute field in its metadata record. In another exemplary aspect, the unique identity for a resource can be composed of a number of logically grouped identities. The lambda can indicate the capabilities and/or available of that resource.

Alternatively, in some aspects, a resource may be smart, connected to the Internet (for example in the cloud environment), and may be configured to submit metadata information to listening servers, submitted to the media processing function deployment controller 315. The collected (or otherwise provided) metadata, which itself can be considered input data sources 235, for example, can be stored by media processing function deployment controller 315. Once a request to find and deploy a function to one or more resources in the cloud computing network is generated, the media processing function deployment controller 315 is configured to retrieve resource IDs to determine available and relevant resources for executing the processing function.

In operation, the media processing function deployment controller 315 is configured to deploy the media production workflow that includes the processing function(s) executed within the workflow to produce the media content or asset. More particularly, a media production workflow typically can include a plurality of nodes therein that are each designed and designated to perform a particular task or operation for the workflow (e.g., encoding, multi-view, routing and switching of media signals, and the like).

As also described above, the tasks are executed by functions that can include both pre-calculated parameters and undefined variable parameters. The variables can be other functions, such that each function can be considered a composable graph the includes a number of sub-graphs. Examples of defined or pre-calculated parameters can include a required execution time or execution costs. The undefined variable parameters can include the specific media content (including format, length/size, quality, and the like), lambdas of available resources (as described above) and the like. For example, the undefined variable parameters can comprise a file name in one aspect, which is defined in the media processing function. The received input deliverable (e.g., input source 235) can comprise media content (e.g., received from content generating device 102B) that is associated with a file having the file name. During compiling at runtime, the media processing function modifier 310 can be configured to dynamically modify the media processing function to add the received input deliverable to the file, as an example.

As also described above, the system includes a plurality of media processing nodes or engines that can server for the physical deployment of the media processing functions. Thus, the media processing functions in the job queue 220 can be logical functions that are mapped to the physical functions deployed in the media processing engines 230A to 230N. Thus, in an exemplary aspect, the media processing function deployment controller 315 is configured to select a CPU, a GPU or an FPGA, or a combination thereof, for a given function for deployment thereon for the workflow. As described above, the media processing functions can be dynamically modified during runtime to optimize the task execution according to given constraints of a workflow. For example, different quantization errors may occur based on available arithmetic options in each of the CPU, GPU or FPGA. Another difference could be that compute time could vary significantly, but if the process can wait, the solution might cost less to calculate. In a third difference, the "cloud" might actually reside on premise as a collection of compute nodes, rather than in the cloud. This might be done for reasons of transmission bandwidth, security or both. However, each of these resources may be configured to perform the same media processing function, but with different capabilities (e.g., bandwidth, latency, FLOPs) and/or a different capacity (e.g., 10 Gbps, 5 msec, 1 TeraFlop). These variations in potential deployments enables the media processing function deployment controller 315 select an optimal deployment of the specific function (which is dynamically modified as the variable parameters are subsequently defined and constrained), while balancing cost and time constrains. In an optional aspect, a network configuration analyzer 320 can be configured to additional data for deploying the functions including at least one of a network type, network bandwidth, network latency, processor type, and processor location within the cloud computing network. This data can also be viewed as variable parameters that can constrain a given media processing function at a specified time for execution of the associated tasks. Effectively, the media function management controller 215 can be configured as part of a feedback loop that is constantly or continuously (or periodically) collecting variable parameters and input data to constrain the media processing functions for task execution.

In an alternative or additional aspect, resource manager 210 can be configured to collect this same types of data, i.e., parameter data relating to at least one of a network type, network bandwidth, network latency, processor type, and processor location of the plurality of media processing engines 230A to 230N. The media function management controller 215 can then receive these variable parameters and constraints from the resource manager 210 and apply the received parameter data as the input deliverable to constrain the at least one undefined variable parameter of the subgraph of the media processing function in the job queue 220. For example, if the media processing functions is configured to perform a render function to create an effect on media content for the media production, the media function management controller 215 can receive parameter data, such as available processor type, and apply this variable parameter to the media processing function, which is then compiled at runtime and before task execution.

Accordingly, in an exemplary aspect, the media function management controller 215 partially compiles at least a portion of the plurality of media processing functions before the portion of the plurality of media processing functions are placed in the job queue. That is, the media processing functions can be partially compiled and pre-cached in memory. Then, upon receipt of the otherwise undefined parameters, either the media function management controller 215 and or the selected media processing engine (e.g., of engines 230A to 230N) is configured to compile the partially compiled media processing functions (e.g., accessed from the pre-cache) in runtime in response to the input deliverable that constrains the at least one undefined variable parameter of the subgraph of the partially compiled media processing function. Effectively, the media processing function can be optimized for deployment and execution of the task within the media production workflow.

It is also noted that the media processing function deployment controller 315 can be configured to deploy the respective media processing functions to the cloud (i.e., the engines 230A to 230N) using various techniques as would be appreciated to one skilled in the art. For example, in one aspect, IAC and CAC enables porting (or "lift and shift") that effectively migrates the processing function to the cloud platform (which includes the media production processing components described above). In turn, the selected engine of the cloud computing platform can receive the request and dynamically modify the configurations for the function in response to the request from the media processing function deployment controller 315 dynamically adjust the configuration. In an alternative aspect, the media processing function can be configured as one or more containers within the cloud platform, such that the media processing function deployment controller 315 is configured to generate a new container with an update of the workflow application once the optimal deployment is determined at runtime and. This new container can then be provided to the selected one or more engines 230A to 230N.

Figure 4:
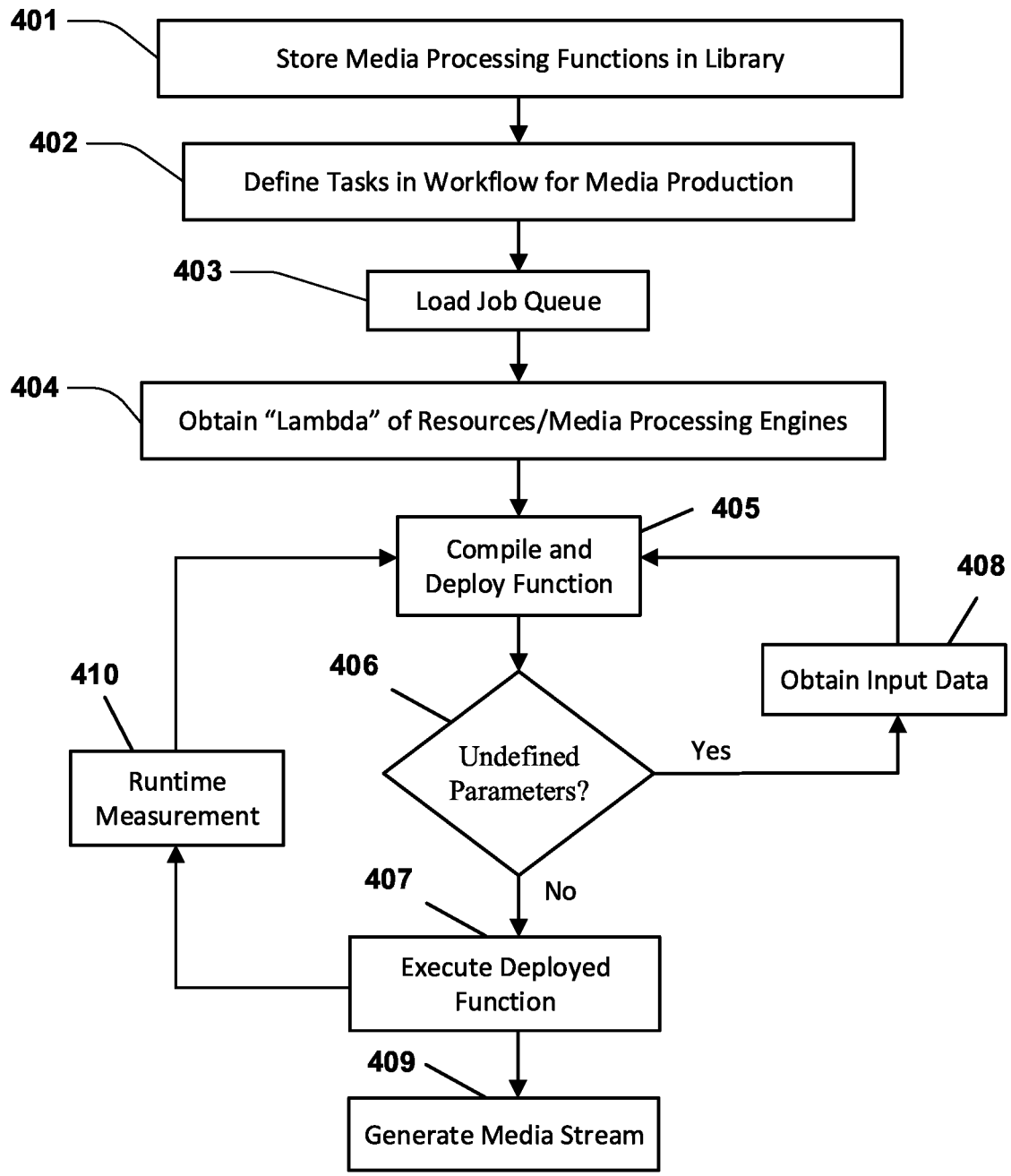
FIG. 4 illustrates a flowchart for a method for dynamically modifying media processing functions to control optimization of a media production according to an exemplary embodiment.

FIG. 4 illustrates a flowchart for a method for dynamically modifying media processing functions to control optimization of a media production according to an exemplary embodiment. In general, it should be appreciated that the method 400 can be executed using one or more of the components described above with respect to FIGS. 1-3.

As shown, the method 400 begins at Step 401 in which a plurality of media processing functions can be stored in media processing function library 225, for example. The functions can be predefined for executing tasks of a media production workflow as described above. The media processing functions can include both pre-calculated parameters undefined variable parameters. Moreover, the media processing functions can be constructed as a graph and a plurality of sub-graphs, which can be considered sub-functions within the main function, each also have one or more undefined variable parameters. As described above, the undefined variable parameters can be subsequently defined based, at least in part, on a resource's lambda, which indicates its available parameters and the like. In one aspect, the media processing functions can be predefined by a system administrator or the like, for example Next, at step 402, one or more tasks are defined in a workflow for media production. Each tasks can be defined by a user (e.g., by a user interface) to define certain required actions to generate the media production. These tasks may be provided as instructions for the resource manager 210, which are in turn transmitted to the media function management controller 215. Based on the specific tasks designated in the workflow, the media function management controller 215 can access the media processing functions in library 225 and load the respective functions in the job queue 220 at step 403.

As also discussed above, APIs are provided between the media function management controller 215 and each media processing engine 230A to 230N. At step 404, the media function management controller 215 can be configured to obtain each resource's lambda, which indicate the resource's capabilities with attendant capacities for deployment of each job in the job queue 220. The media processing functions can then be compiled (or partially compiled) at step 405 by the media function management controller 215 (i.e., the media processing function deployment controller 315) and deployed to the specific resource or engine selected to execute the function and associated task. It should be appreciated that in certain exemplary aspects, the media function management controller 215 can be configured to partially deploy a plurality of the media processing functions in the job queue 220 to be executed in parallel by the plurality of media processing engines 230A to 230N, respectively, in response to the media production instruction from the client device 205.

As also discussed above, the media processing functions can be partially deployed at runtime if the specific function includes one or more undefined variable parameters. The media function management controller 215 maintains a mapping of the logical function to physical deployment of the function. Moreover, at step 406, the respective resource (i.e., the media processing engine) can determine if there are undefined parameters in the function before execution. In this way, the media processing engine can directly or from the media function management controller 215 receive one or more data inputs at step 408, which may be define data deliverable, including for example, updated lambda information for the resource. This data can be fed back to step 405 based on the logical to physical mapping, where a second compiling of the media processing function can then be performed such that the function can be deployed and executed. In this way, the system is configured as a feedback loop or control system to constantly receive input data for variable parameters to optimize the execution of the particular tasks in the media production workflow (i.e., at step 407). Finally, once the parameters are all constrained in a given instance (i.e., there are no undefined parameters at step 406), the function can be executed to generate the media stream for the media production at step 409. In addition, it should be appreciated that in one exemplary aspect, the media processing function can be partially executed while waiting to receive the input data to fully constrain the function. In this aspect, the function can be partially deployed and executed at step 407. Moreover, a runtime measurement can be performed at step 410 to determine any changes in the lambda of the deployed engine node as described above. Based on detected changes, the optimization can be performed on another pass at step 405 as a feedback loop. As a result, the method provides for dynamically modifying the deployed media processing function to control optimization of a media production as described herein.

According to the exemplary method, the media production can be executed and includes the deployed media processing functions, which are configured based on criteria defined by a user or system, for example. Moreover, the whole machine (e.g., combination of resources) can be considered to be elastic and dynamically adjustable in real-time (e.g., at runtime) based on the variations of the constrained parameters. As a result, the optimization deployment system can mutate the one or more machines that execute the media processing function to optimize the accessibility of the memory load. Thus, during execution of the workflow, the input data (at that stage of the workflow) can be delivered to the selected machines/resources for executing the media processing function and then returned as part of the flow of the media production as defined in the workflow.

Figure 5:
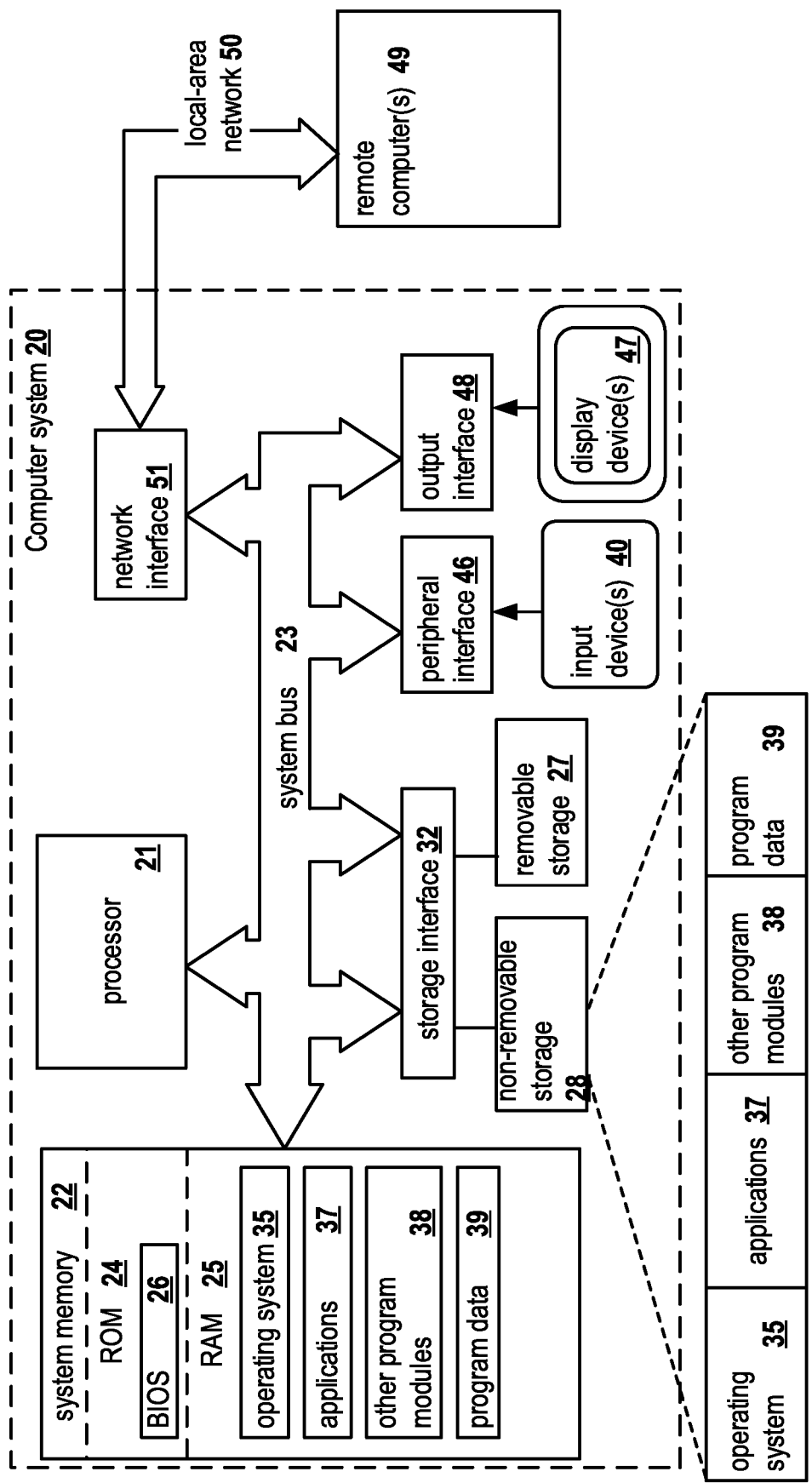
FIG. 5 is a block diagram illustrating a computer system on which aspects of systems and methods for dynamically modifying media processing functions to control optimization of a media production according to an exemplary embodiment.

FIG. 5 is a block diagram illustrating a computer system on which aspects of systems and methods for dynamically modifying media processing functions to control optimization of a media production according to an exemplary embodiment. It should be noted that the computer system 20 can correspond to the media production optimization system 101 of system 100 or any components therein, including, for example, the media management controller 215. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives;
magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment (e.g., network 110), using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces. In an exemplary aspect, the one or more remote computers 49 can correspond to the cloud computing network 110 and or one or more of the components shown in FIGS. 1 and 2, for example, as described above.

In general, exemplar aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for dynamically modifying media processing functions to control optimization of a media production, the system comprising:
  a media processing function library configured to store a plurality of media processing functions, with the plurality of media processing functions each including a subgraph embedded therein that has at least one pre-calculated parameter and at least one undefined variable parameter;
  a plurality of media processing engines that are each configured to execute at least one of the plurality of media processing functions to create the media production, with the plurality of media processing engines each including at least one of a computer processing unit (CPU), a graphics processing unit (GPU), and a field programmable gate array (FPGA);
  a media function management controller configured to place at least a portion of the plurality of media processing functions from the media processing function library in a job queue to be executed by at least one of the plurality of media processing engines for the media production, wherein the portion of the plurality of media processing functions are partially compiled before the portion of the plurality of media processing functions are placed in the job queue and the at least one media processing engine is configured to compile the partially compiled media processing functions in runtime in response to the input deliverable that constrains the at least one undefined variable parameter of the subgraph of the partially compiled media processing functions;
  a resource manager configured to receive a media production instruction from a client device to partially deploy one or more of the media processing functions in the job queue to be executed by the at least one media processing engine,
  wherein during execution of the partially deployed one or more media processing functions, the at least one media processing engine is configured to receive an input deliverable that constrains the at least one undefined variable parameter of the subgraph, such that the partially deployed one or more media processing functions is dynamically modified during runtime to create the media production.

2. The system according to claim 1, wherein the at least one undefined variable parameter comprises a file name and the received input deliverable comprises media content associated with a file having the file name.

3. The system according to claim 1, wherein the plurality of media processing engines are resources available in a cloud computing network.

4. The system according to claim 3, wherein the input deliverable comprises parameter data relating to at least one of a network type, network bandwidth, network latency, processor type, and processor location of the plurality of media processing engines in the cloud computing network.

5. The system according to claim 1, wherein the resource manager is further configured to receive parameter data relating to at least one of a network type, network bandwidth, network latency, processor type, and processor location of the plurality of media processing engines.

6. The system according to claim 5, wherein the media function management controller is further configured to apply the received parameter data as the input deliverable to constrain the at least one undefined variable parameter of the subgraph.

7. The system according to claim 1, wherein the portion of the plurality of media processing functions are configured to perform a render function to create an effect on media content for the media production.

8. The system according to claim 1, wherein the resource manager is configured to partially deploy a plurality of the media processing functions in the job queue to be executed in parallel by the plurality of media processing engines, respectively, in response to the media production instruction.

9. The system according to claim 1, wherein the portion of the plurality of media processing functions placed in the job queue are tasks of a media production workflow configured to generate the media production during runtime.

10. A system for dynamically modifying media processing functions to optimize a media production, the system comprising:
   a plurality of media processing engines that are each configured to execute at least one of a plurality of media processing functions to create the media production, with the plurality of media processing engines each including at least one of a computer processing unit (CPU), a graphics processing unit (GPU), and a field programmable gate array (FPGA);
   a media function management controller configured to place at least a portion of the plurality of media processing functions in a job queue to be executed by at least one of the plurality of media processing engines for the media production, wherein the portion of the plurality of media processing functions are partially compiled before the portion of the plurality of media processing functions are placed in the job queue and the at least one media processing engine is configured to compile the partially compiled media processing functions in runtime in response to the input deliverable that constrains the at least one undefined variable parameter of the subgraph of the partially compiled media processing functions;
   a resource manager configured to receive a media production instruction from a client device to partially deploy one or more of the media processing functions in the job queue to be executed by the at least one media processing engine,
   wherein during execution of the partially deployed one or more media processing functions, the at least one media processing engine is configured to receive an input deliverable that constrains at least one undefined variable parameter, such that the partially deployed one or more media processing functions is dynamically modified during runtime to create the media production.

11. The system according to claim 10, further comprising a media processing function library configured to store the plurality of media processing functions, with the plurality of media processing functions each including a subgraph embedded therein that has at least one pre-calculated parameter and the at least one undefined variable parameter.

12. The system according to claim 10, wherein the at least one undefined variable parameter comprises a file name and the received input deliverable comprises media content associated with a file having the file name.

13. The system according to claim 10,
   wherein the plurality of media processing engines are resources available in a cloud computing network, and
   wherein the input deliverable comprises parameter data relating to at least one of a network type, network bandwidth, network latency, processor type, and processor location of the plurality of media processing engines in the cloud computing network.

14. The system according to claim 10, wherein the resource manager is further configured to receive parameter data relating to at least one of a network type, network bandwidth, network latency, processor type, and processor location of the plurality of media processing engines.

15. The system according to claim 14, wherein the media function management controller is further configured to apply the received parameter data as the input deliverable to constrain the at least one undefined variable parameter.

16. The system according to claim 10, wherein the portion of the plurality of media processing functions are configured to perform a render function to create an effect on media content for the media production.

17. The system according to claim 10, wherein the resource manager is configured to partially deploy a plurality of the media processing functions in the job queue to be executed in parallel by the plurality of media processing engines, respectively, in response to the media production instruction.

18. The system according to claim 10, wherein the portion of the plurality of media processing functions placed in the job queue are tasks of a media production workflow configured to generate the media production during runtime.

* * * * *